Patented July 8, 1952

2,602,798

UNITED STATES PATENT OFFICE 2,602,798

4,5 DIPHENYLGLYOXALONE-DISULFONYL CHLORIDE AND PROCESS OF PRODUCING THE SAME

Milton L. Hoefle and William Wilson Williams, Easton, Pa., assignors to General Aniline & Film Corporation, New York, N. Y., a corporation of Delaware No Drawing. Application January 15, 1951, Serial No. 206,118

2 Claims. (Cl. 260—309.6)

This invention relates to the novel compound 4,5-diphenylglyoxalonedisulfonyl (or 4,5-diphenylimidazolone disulfonyl) chloride and its method of preparation.

It has been found that the sodium 4,5-diphenylglyoxalonedisulfonate (as described in German Patent No. 735,478, first example) is readily converted to disulfonyl chloride by treatment of chloro-sulfonic acid. By this method the disulfonyl chloride is obtained in excellent yield and in sufficient purity to be satisfactory for use in the preparation of fluorescent brightening agents by condensing the same with ammonia or simple primary and secondary aliphatic aromatic or heterocyclic amines whereby sulfonamides which are of value as fluorescent brightening agents for textiles and the like are obtained and which are of particular interest for the brightening of wool and protein fibers in general.

The details of the present invention will be apparent from a consideration of the following specific example:

To 220 grams of sodium 4,5-diphenylglyoxalone disulfonate in a 2-liter flask is added 1160 grams of cholorsulfonic acid. The resulting mixture is heated at 100° C. for four hours; then drowned in cracked ice. The total volume of solution at this point is 6 liters. The product, 4,5-diphenylglyoxalone disulfonyl chloride, is removed by filtration and the filter cake washed with one liter of ice water, is obtained in good yield and is of high purity. It has the formula:

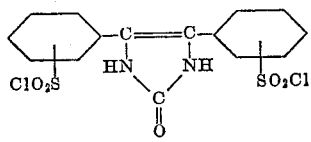

It will be understood that the foregoing example illustrates a preferred embodiment of the process of the present invention. However, some variations may be made in the operating conditions, if desired. Thus, the reaction may be effected at temperatures within the range of 75° to about 155° C. (the boiling point of chlorosulfonic acid); the proportions of chlorosulfonic acid and sodium 4,5-diphenylglyoxalone disulfonate may also be varied somewhat. Relatively good yields are obtained when as little as 3 parts by weight of chlorosulfonic acid are used per part of sodium 4,5-diphenylglyoxalone disulfonate. However, there is no substantial advantage in using much more than about 5 parts of chlorosulfonic acid (i. e., more than the amount used in the above example) to each part of sodium 4,5-diphenylglyoxalone disulfonate.

We claim:

1. 4,5-diphenylglyoxalonedisulfonyl chloride of the formula:

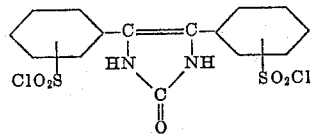

2. The process of producing 4,5-diphenylglyoxalonedisulfonyl chloride of the formula

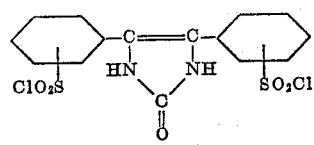

which comprises heating to about 75°–155° C. a mixture of about 3 to 5 parts by weight of chlorosulfonic acid and about 1 part of sodium 4,5-diphenylglyoxalone disulfonate, and recovering the thus produced 4,5 diphenylglyoxalone disulfonyl chloride.

MILTON L. HOEFLE.
WILLIAM WILSON WILLIAMS.

REFERENCES CITED

The following references are of record in the file of this patent:

FOREIGN PATENTS

| Number | Country | Date |
|---|---|---|
| 735,478 | Germany | May 18, 1943 |